Aug. 12, 1924. 1,504,459
G. WASHINGTON
AMORPHOUS SACCHARINE POWDER CONTAINING IMPALPABLE SOLIDS AND
PROCESS OF MAKING THE SAME
Filed June 7, 1918 2 Sheets-Sheet 2

Inventor
George Washington
By his Attorney
N. Parker Smith

Patented Aug. 12, 1924.

1,504,459

UNITED STATES PATENT OFFICE.

GEORGE WASHINGTON, OF BROOKLYN, NEW YORK.

AMORPHOUS SACCHARINE POWDER CONTAINING IMPALPABLE SOLIDS AND PROCESS OF MAKING THE SAME.

Application filed June 7, 1918. Serial No. 238,629.

*To all whom it may concern:*

Be it known that I, GEORGE WASHINGTON, a citizen of the United States of America, residing at Brooklyn, city of New York, county of Kings, and State of New York, have invented certain new and useful Improvements in Amorphous Saccharine Powder Containing Impalpable Solids and Processes of Making the Same, of which the following is a specification.

My invention relates generally to a new form of saccharine matter and more specifically comprises certain improved compounds therewith containing and preserving insoluble nutritive flavoring or stimulating constituents.

The foundation of my invention primarily resides in my discovery of the fact that, when a perfect solution of a saccharine substance such as cane sugar is carefully evaporated under reduced pressure to dryness, and under conditions inhibitive of crystallization or granulation, the dried residue will consist of a homogeneous glass-like modification of sugar of peculiar physical structure, possessing qualities and properties not found in any of the different crystalline, granular, powdery or syrupy forms in which such substances now appear in the arts.

Secondarily my invention involves the further discovery that such residue is eminently adapted to serve as a solid vehicle or matrix for the retention and preservation of many otherwise perishable insoluble nutritive substances, from which the latter can be instantly released by simple solution.

My invention therefore enables me, by incorporating in syrups of various kinds of sugar various substances, such as eggs, milk starches, cocoa powders, chocolates, to obtain a series of new and useful, dry, soluble preparations from which one can instantly prepare, by simple solution, liquid foods or refreshing beverages, as the case may be, such as eggnogs, milk, cocoa, chocolate, coffee with milk, etc.

As an illustration of one manner in which my invention is carried into effect: I will now describe the procedure of manipulating a simple saccharine substance such as, for instance, cane sugar, and modifying the same into my new and improved form. To this end an amount of cane sugar is perfectly dissolved, preferably by stirring a id without application of heat, in the least possible quantity of water so as to make a nearly but not quite saturated solution (more water might of course be used but this would merely and unduly prolong the work of evaporation, without in the least affecting the final result). The syrup so prepared is next poured into a vacuum dish or pan which is perfectly clean and free from any sugar dust or sugar crystals if pure cane sugar or other crystallizable form of saccharine matter is used alone, as otherwise the residue will crystallize or granulate by an automatic propagation of crystallization and the modified amorphous form of sugar will not result.

The pressure in the vacuum pan is next reduced to about one inch of mercury by a convenient vacuum pump which is arranged to draw the air, and eventually the vapors, from the pan through a cooled condenser. The pan is then heated, preferably by hot water or steam of the required temperature, to a carefully regulated degree so as to keep the syrup from boiling too violently and perhaps foaming over into the condenser. As is well known, the heat applied to such a mass of syrup cannot raise its temperature to any appreciable amount above any given boiling point as long as there is enough moisture in it for it to emit bubbles of steam. So long as ebullition continues the temperature of the boiling mass will remain constant, as it is in reality regulated by, and depends on, the degree of absolute pressure maintained over the boiling syrup in the pan. Thus, for a pressure corresponding to one inch of mercury the boiling temperature is about 77° F. As the mass keeps on boiling and the water keeps on evaporating the syrup will thicken and become less and less plastic while the emission of steam bubbles will become less and less frequent and more difficult. Finally bubbles will only form as a result of a slight local superheating of the mass, which at the superheated point will somewhat soften so that the issuing steam will swell out a bubble that eventually will no longer burst or break. On the contrary, owing to the cooling effect of evaporation and expansion, the walls of this bubble will at once harden and become self sustaining. Meanwhile other spots in the mass will also locally super-heat, soften, puff up, cool off and harden, and so on until the whole residue has become a foamlike mass of bubbles, which, though at first soft or slightly plastic owing to the retention of some residual moisture, will soon become hard and finally brittle through continued drying and final cooling. When this result is reached the process will be terminated and the vacuum may be broken.

The result of the operation just described will be a foamlike mass of desiccated bubble walls consisting of a homogeneous modification of cane sugar similar to the sugary mass which is obtained by suddenly cooling molten or fused cane sugar and which is commonly known as "barley sugar." It is here to be noted that although I believe that both of the homogeneous sugars just mentioned are similar if not identical in their chemical compositions, their physical forms are vastly different, as one consists of exceedingly fine pellicular walls which may be broken, slightly crushed and sifted into a loose, light, curvy-lamular, snow white powder, which has not been affected in any way by caramelization or other results of heat, whereas the other consists of a dense, glassy, amber colored mass, at least partially caramelized and otherwise affected by the high temperature necessary in its production. Moreover, the essential thing for the production of the one is moisture and boiling at low temperature, while for the other, it is freedom from moisture and fusion at relatively very high temperature.

It will therefore be realized at once that if one is adapted to receive and hold as in a matrix, delicate flavors and aromatic substances easily destroyed by heat, the other is utterly useless for the same purpose; furthermore that, while the loose, fluffy pellicular powder obtained from the one is eminently adapted to instant solution in water without tendency to cake or pack in doing so, the powder obtained by pulverizing the other will of necessity be dense and compact and correspondingly hard to dissolve, and liable to packing or caking in the dissolving process.

The reasons why this pellicular powder has such great dissolving velocity are that the thin, curved sections of the bubble walls comprising it are practically anhydrous and have large surfaces in proportion to their masses so that they greedily drink up water, and also that, as a result of their shapes, there is always a large percentage of voids in a given mass of them, through which voids the solvent fluid may pass easily and rapidly to immediate contact with the extensive surfaces of the particles.

As an illustration of this fact I may point out that by my process maple juice can be obtained as a dry, snow white preparation, perfectly free from caramelization or the result of heat, while, as is well known, whole maple sugar as obtained under present methods of production is a brown, partially caramelized product.

It is apparent also that, in the case of pure glucose, or of any other form of sugar or saccharine substance or compound which similarly occurs commercially in a solid, sticky, somewhat slowly soluble mass which is inconvenient to handle, the transformation thereof into the dry, quickly soluble, flaky powder by my invention constitutes an important practical step in advance in the art.

For the purpose of elucidation it may be well to further state that while preparing modified sugar as above described, though it is desirable, it is not essential, for the purpose of obtaining the foamlike residue, to carry on evaporation and desiccation under as high a vacuum and at as low a temperature as above stated. On the contrary it is only essential that the temperature shall not rise during desiccation to a point where the product under preparation would suffer deterioration, or at which the dried mass might sufficiently soften and fuse so as to destroy the self supporting quality necessary to the structure of the residue.

I have found that during the desiccation of a sugary mass as above described, formation and desiccation of bubbles proceeds from the heated surface gradually towards the upper free surface of the mass, and as it is evident that after a layer of bubbles has been built up between the heating surface and the rest of the mass to be desiccated it will act as a very efficient insulator, the further transmission of heat to the remaining mass will thereafter go on very gradually. Consequently, if the mass being treated is of any considerable thickness the time necessary for complete desiccation will be greatly extended. For this reason I have found it essential in efficient practice to resort for desiccating purposes to a class of apparatus of relatively large heating surface, adapted to handle thin layers of mass for desiccation. In practice I have also found it preferable to cool the foamy residue before taking it off from the drying surface, as this renders it generally hard and brittle and much easier of removal.

I have further found that when the mass treated as above described consists of purely saccharine substances the general size of the bubbles and the thickness of the bubble walls depends on the thickness of the layer applied to the heating surface and that the bubbles are smaller and their walls thinner in proportion as the layer to be dried is thinner.

I have also found that the formation of bubbles is not affected by the addition or incorporation with the syrup of a solution of certain soluble extracts such as extract of tea leaves, roasted coffee beans, etc., nor seemingly is the bubble formation of a saccharine residue affected by the presence therein of fat globules such as butter fat or cocoa butter, in small amounts. On the other hand I have found that the formation of the foamlike residue as well as the size of the bubbles and the thickness of the bubble walls is influenced by any insoluble solid matter contained or incorporated in the saccharine syrup. This is due to the fact that the presence as well as the quantity of such insoluble solid matter (such as starches, cocoa powder and fibre, milk solids, egg yolk solids, pulp and pectic matter of fruits, etc.) decreases both the plasticity and especially the viscosity of the desiccating mass. In this respect I have ascertained for instance, that in preparations containing sugar and cocoa powder and sugar and milk solids, the formation of bubbles and foamlike residue virtually ceases when the proportion of cocoa reaches 30% and that of milk solids 35%, respectively, of the total solids in such preparation.

Since it is obvious that the large proportion of sugar or other soluble matter to one part of insoluble matter, above given, would in many cases result in a product too sweet for the ordinary consumer's taste if the sweeter forms of sugar be used, to secure a generally acceptable commercial product, other forms of sugar having lower sweetening effects, such as grape sugar or glucose, should in the majority of cases be used in whole or in part rather than pure cane or other very sweet variety of sugar. This can be done without otherwise affecting the product as any form of sugar will assume the foam-like bubble formation and desiccate completely in that form when treated as above described.

When a saccharine solution or syrup in combination with aromatic principles, and for that matter with perishable matter such as milk solids, is desiccated into such foamlike mass, the homogeneous sugar has a decided preservative action upon said perishable matter, inasmuch as it serves the purpose of a solid vehicle and acts as a matrix in which are hermetically sealed the particles that would otherwise lie open to the deteriorating influences of the atmosphere.

I have further discovered that in order to obtain a homogeneous sugar or a homogeneous sugary preparation from a crystallizable sugar such as cane sugar, it is absolutely essential that all the sugar be brought in a perfect state of solution before concentration and desiccation are proceeded with, because crystallization or granulation, whenever possible, will always be produced in preference to the homogeneous sugar modification, and only a single seed crystal is essential to start the action, which is exothermic or heat giving, whereas homogeneous desiccation is endothermic or heat absorbing. In connection with this I have found that certain noncrystallizable saccharine matters, such as glucose, have an inhibitive effect upon the crystallizing propensities of crystallizable saccharine matter so that it is often advisable to use various saccharine matters in combination, the non-crystallizing component or components then exerting a useful restraining effect on the crystallizing tendencies of the other component or components.

If a sufficient proportion of commerical glucose be used, say enough to constitute about 50% of the saccharine constituents, the restraining effect on the tendency of the other saccharine matter to crystallize is so great that a certain quantity of the dry particles of one batch may be allowed to stay in the apparatus and mix with the syrup being evaporated to form the next batch without the crystallization which would otherwise occur if pure cane sugar, or other crystallizable form of saccharine matter, were used alone and exposed to the action of such carried-over dry particles.

I am aware that the ability of sugar to retain and preserve to a greater or less extent the flavor and substance of certain food products and beverages has long been well known, and that the use of sugar in the form of syrups for this purpose has long been common practice, as in the making of jams and preserves, but, so far as known to me, all previous efforts to manufacture a dry form of sugar, either alone or in food preserving combinations, have resulted in the production of the crystalline form of sugar or barley sugar and these simply will not serve for reasons above given.

As a concrete example of the manner of putting my invention into practice in the manufacture of a powder which, upon the addition of water, hot or cold, will produce the beverage known as coffee with milk, sweetened to suit the average taste, I would proceed as follows:

I place in a clean vessel about 205 pounds of pure, whole milk which will contain about 27 pounds of solids (or preferably the same amount of milk previously condensed to one-third its original volume), and dissolve therein by constant stirring and without heating, about fifty-five pounds of granulated sugar. When the solution is complete and perfect, I add thereto (also under constant stirring) a previously prepared concentrated percolate of roasted coffee beans in such quantity as will contain eighteen pounds of dry but soluble coffee extractive matter.

The same result may be attained with less trouble by using such a quantity of any standard commercial form of condensed milk containing sugar as would be produced from the above stated quantity of whole milk, and then adding thereto the concentrated percolate of roasted coffee beans as above described.

The mixture formed by either of the above described precedures is next poured into the trays of a vacuum shelf dryer or other suitable evaporating device, and the fluid content evaporated. If the milk and the coffee extract have been well concentrated, a layer of a quarter inch thickness in the drying apparatus will suffice. If the concentration is less advanced thicker layers should be formed. The pressure and consequent temperature should be maintained sufficiently low to avoid any chance of spoiling the taste of the constituents, or of fusing the sugar. An average pressure of about one-half inch of mercury gives efficient operation and good results.

The operation is continued until the residue has become perfectly dry and has puffed up into a foamlike mass of dessicated bubble-walls, consisting of the hereinbefore described glassy modification of sugar holding in intimate solid solution, so to speak, all the milk solids and coffee extractive and aromatic matters and individually surrounding with sugary shells or sheetings all the little milk fat globules, protecting them against the effect of the atmosphere and resulting rancidity, serving substantially as a solid vehicle wherein to hold and conserve the aromatic principles of the coffee as well as the nutritive qualities of the milk, and yet ready to release them at any time when solution in hot or cold water occurs. This resolution of the sweetened milk powder produces an emulsion of the milk solids which is the same thing as sweetened fresh milk.

So far as concerns the sweetened milk-coffee produced by adding water when the concentrated coffee percolate has been employed as above described in making the composite powder, the same result could evidently be secured by making the sweetened milk powder without including the coffee in the composition, but adding the concentrated coffee percolate to the milk powder at the time the beverage is made by the consumer stirring the two powders into water. By this latter procedure the proportion of coffee to milk and sugar can be adjusted by each consumer to suit his particular taste.

Although at a pressure of one half inch of mercury evaporation normally takes place at a temperature of about 60 degrees Fahrenheit, the temperature may be raised to 120 degrees Fahrenheit or slightly higher at the end of the evaporation period in order to remove the last traces of humidity, and without in any way impairing the qualities of the product. The residue will be soft and pliable while hot and not adapted to be broken up, scraped off and sifted to the best advantage until after it has been allowed to cool. When cool it will be found hard and brittle and can then be easily handled by crushing and sifting to form a uniform product in the shape of a relatively fine powder.

The lighter and fluffier the bubble walls, the more rapidly soluble is the powder formed by crushing and sifting them, and this rapidity of solution is especially important in milk preparations as it tends to prevent, or forestall, the tendency of the milk to be curdled by any such concurrent reaction as that of the tannic acid of coffee or tea on the solids of the milk. Apparently if the redissolving process is rapid enough to permit the fat globules to return completely to their original emulsified condition in the solution in a very short time, this curdling reaction is totally avoided. The presence of sugar also has a neutralizing or retarding effect on this curdling reaction and the larger the quantity of sugar present, the less is the liability of the curdling of the milk. If the sugar content falls below 40% of the total mass of the powder the solids of the mixture will be mostly, if not entirely, precipitated by curdling during solution in boiling water. If the sugar content is above 55%, curdling of the milk in boiling water is totally avoided.

The proportion of milk solids to coffee solids in the residue is largely one of personal taste, but I have found the average taste is satisfied between one part of coffee solids to one part of milk solids and one part of coffee solids to three parts of milk solids.

When soluble matter, such as coffee extract, is used with the milk and sugar, the soluble extract takes the place of practically an equal amount of sugar so far as aiding in the bubble formation is concerned. In other words, the quality of forming the glassy bubble walls herein described is not a property possessed by sugar alone, but is characteristic of certain other soluble materials. If such a material, such as coffee extract, is used with the sugar the bubbles will form properly even if the insoluble matter present (such as milk solids or chocolate) is more than one third of the weight of the sugar, so long as such insoluble matter is less than thirty-five per cent of the total weight of the sugar, the soluble coffee extract, and the insoluble matter (milk solids) combined.

To state the proposition in another way I may say that so long as the total soluble matter, (saccharine or other soluble materials) constitutes sixty-five per cent or more of the total solids (both soluble and insoluble) the proper bubble formation will occur.

I have further found, as before stated, that in case a given mixture containing enough cane sugar to be fluffy and soluble may prove too sweet, resort may be had to a sugar of less sweetening capacity, such as grape sugar or glucose, which may be used wholly or partially as a substitute without in any way impairing the other qualities of the preparation so long as the total amount of sugars and auxiliary soluble matter bears the proper relation to total amount of the insoluble materials of the mixture.

I have further discovered, as before suggested, that it is sometimes difficult to obtain the residue in the foamlike mass described because when the concentration has proceeded to a certain point the residue suddenly granulates or crystallizes and the resulting dry product will then yield upon solution only a beverage that will be flat and devoid of the volatile and aromatic principles of coffee, and in which the milk solids and the fat globules will not be surrounded or incased by protecting sugar and therefore will soon become rancid and otherwise deteriorate. This tendency of this residue to granulate or crystallize is generally due to the incomplete solution of the sugar in the milk before evaporation is begun, or is caused by any undissolved residue remaining in the vacuum dryer from a prior drying operation. I have also found that if the sugar in the mixture comprises from 10 per cent to 15 per cent of commercial glucose, the inhibitive properties of the latter will generally be sufficient to prevent any such granulation, even under a moderate occurrence of the above described conditions. This I believe to be due to the action of the dextrine which usually occurs in commercial glucose. Probably other gums than dextrine might have the same beneficial effect in properly regulated quantities.

A form of apparatus suitable for carrying out the above described process is illustrated in the accompanying drawings in which—

Figure 1:
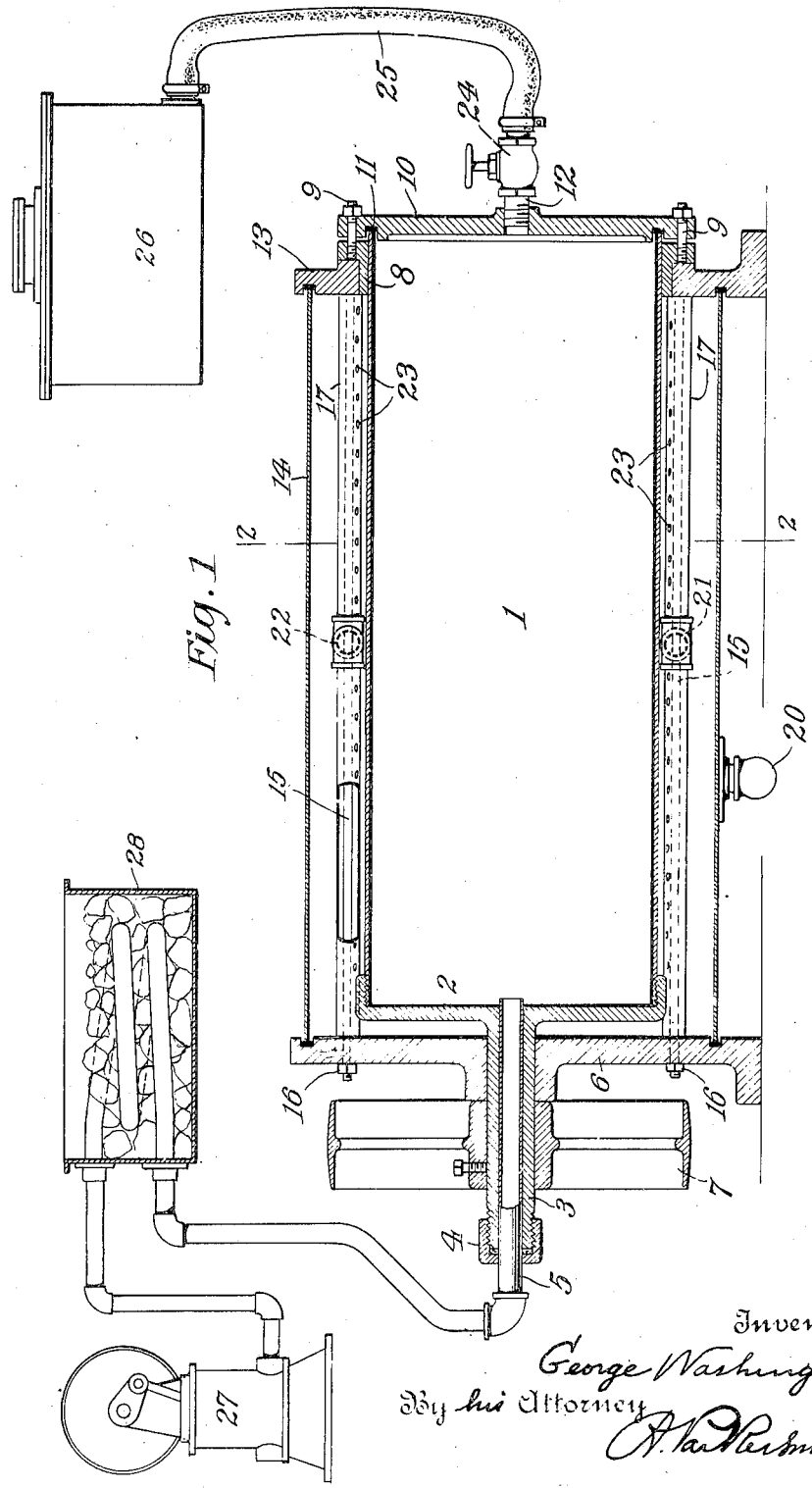
Fig. 1 is a side view of the apparatus, shown partly in section.
Figure 2:
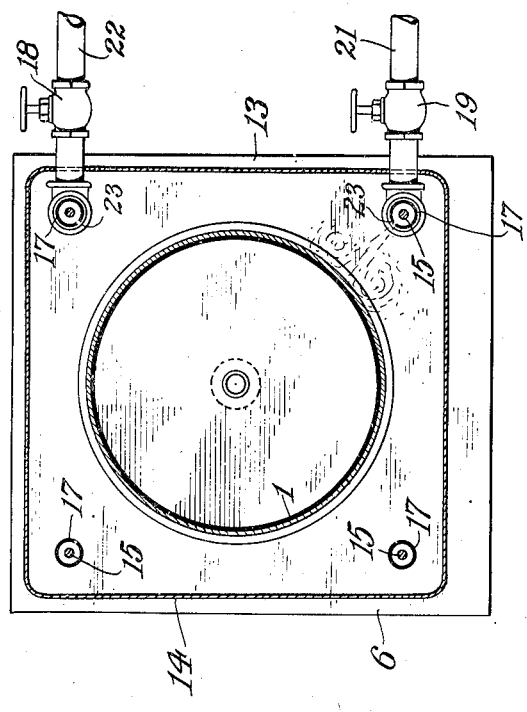
Fig. 2 is a vertical section taken on line 2—2 of Fig. 1.

Throughout the drawings like reference characters indicate like parts. 1 is a horizontal, hollow cylinder, which may be made of metal with a glass or enameled lining and provided at one end with a permanent cap 2, and at the other with a removable end plate or cover 10, held by bolts 9, 9, to a bearing ring 8, fast on that end of the cylinder. The joint between cylinder end and cover may be made air-tight by a gasket 11. This cylinder or retort 1 is journaled on a horizontal axis, as by trunnion 3 on cap 2 revolving in header 6, and bearing ring 8 revolving in the opposite header 13. Headers 6 and 13 are spaced apart by tubes 17, 17, and held against the ends of said tubes by rods 15, 15, threaded at their ends and provided with external nuts 16, 16. The headers also support a shell 14 surrounding the retort 1, and forming a jacket or casing therefor. One of the pipes 17 is connected to a heating pipe 21 which delivers a fluid heating medium such as steam controlled by a valve 19. Another supplies a cooling medium, such as cold water, delivered through a pipe 22, controlled by a valve 18. These two pipes 17, 17, have perforations 23 so located that jets of the contained fluids are discharged against the exterior surface of retort 1. The waste water and condensed steam are trapped off through trap 20 at the bottom of the jacket or casing formed by headers 6 and 13 and plates 14.

Retort 1 may be rotated by pulley 7 on the exterior of trunnion 3. This trunnion is centrally bored and receives pipe 5, with which it makes an air-tight joint by means of stuffing box 4. Similarly, cover plate 10 is centrally bored to receive pipe 12 controlled by valve 24. This pipe 12 may conveniently be connected to a hose 25 which leads from any suitable reservoir 26. Pipe 5 extends to a suction pump 27 passing through any suitable cooling device such as a receptacle 28 for cracked ice, in the interior of which said pipe 5 is coiled to give a large radiating surface and serve as a condenser of vapors drawn from the retort 1.

The foregoing apparatus forms a convenient device for concentrating and desiccating any proper solution placed in reservoir 26 into the desired mass of bubbles with glassy walls herein before described. A partial vacuum being formed in retort 1, by operating pump 27, and valve 24 being opened, a proper quantity of the solution in reservoir 1 is sucked into the retort, and, on closing valve 24, the retort is set in rotation by means of pulley 7. Steam is then admitted through pipe 21, and the steam jets impinging on the revolving retort heat it to the desired temperature to produce the concentration and ultimate desiccation of the contents. The vapors liberated by ebullition of the solution being drawn off by the pump through the condensers, the steam is then shut off, the retort and contents cooled by the jets of water admitted through pipe 22, the vacuum broken and the dessicated contents scraped from the interior walls of the retort after cover 10 has been removed.

Upon repeating the above described operation it is advisable to first admit a small quantity of water to the retort and to revolve the same to make sure that any particles of the preceding batch therein remaining are completely dissolved, or to make sure that the sugar and other materials admitted form an unsaturated solution which will similarly dissolve the left-over particles. Either procedure will prevent such left-over particles from starting the process of crystallization when the concentrating of the second batch begins.

I am aware of the fact that preparations of coffee with milk and sugar have heretofore been proposed, either by mixing milk powder with sugar and dried coffee extract, or by evaporating milk and coffee with or without sugar, but so far as I know, none of these preparations have any practical value. Those produced by mixing milk powder with sugar and dried coffee extract are either insoluble or produce a badly curdled solution when re-dissolved. Those formed simply of evaporated milk and coffee are also impossible or difficult of solution, yielding a mass that is tough and leathery and not adapted to transformation into an easily soluble powder free from the defects above enumerated. Neither possesses the desirable aromatic and nutritive properties of the original components.

The advantages of my invention for hotel, restaurant and family use are considerable, but its greatest benefits are realized in its use by travelers, camping parties and armies in the field, and on shipboard, in all of which instances the enormous saving in transportation cost alone, is of the utmost importance. For instance a shipload of the powder for making sweetened coffee with milk prepared in accordance with my invention will supply a quantity of that beverage to our army in France of the same quality as though made on the ground out of fresh roasted coffee beans and the best milk, which would require five to six similar shiploads of coffee beans and condensed milk and sugar for its production in the usual way.

Various changes evidently could be made in the exact steps of procedure herein described, and in the materials employed, without departing from the substance of my invention so long as the principles of operation and general characteristics herein outlined are retained.

Having described my invention, I claim:

1. As a new article of manufacture a powder composed of a mixture of amorphous soluble materials and impalpable insoluble materials, which powder is in the form of small, thin, readily soluble pellicles consisting of the desiccated and broken walls of bubbles of a perfect solution of the said soluble materials, together with the impalpable insoluble substances retained therein.

2. As a new article of manufacture a powder composed of a mixture of amorphous soluble materials and inpalpable insoluble materials of a perishable nature, which powder is in the form of small, thin, readily soluble pellicles derived from the desiccated and broken walls of bubbles of a perfect solution of the said soluble materials, together with the impalpable insoluble substances of a perishable nature retained therein, the amount of insoluble materials being not more than thirty-five per cent by weight of the total solids of the mixture.

3. As a new article of manufacture a powder composed of a mixture of amorphous saccharine materials and impalpable insoluble materials, which powder is in the form of small, thin, readily soluble pellicles consisting of the desiccated and broken walls of bubbles of a perfect solution of the said saccharine materials, together with the impalpable insoluble substances retained therein, the amount of insoluble materials being not more than thirty-five per cent by weight of the total solids of the mixture.

4. As a new article a powder comprising a mixture of saccharine materials and milk solids, which powder is in the form of small, thin, readily soluble pellicles consisting of the desiccated and broken walls of bubbles of a perfect solution of said saccharine materials with the milk solids retained therein.

5. As a new article of manufacture a powder composed of a mixture of amorphous soluble materials and impalpable insoluble materials, which powder is in the form of small, thin, readily soluble pellicles consisting of the desiccated and broken walls of bubbles of a perfect solution of the said soluble materials having volatile essential oils and aromatic principles, together with the impalpable insoluble substances retained therein, the amount of insoluble materials being not more than thirty-five per cent by weight of the total solids of the mixture.

6. As a new article of manufacture a powder composed of a mixture of amorphous soluble materials and impalpable insoluble materials of a perishable nature, which powder is in the form of small, thin, readily soluble pellicles consisting of the desiccated and broken walls of bubbles of a perfect solution of the said soluble materials having volatile essential oils and aromatic principles, together with the impalpable insoluble substances of a perishable nature retained therein, the amount of insoluble materials being not more than thirty-five per cent by weight of the total solids of the mixture.

7. As a new article of manufacture a powder composed of small, thin, readily soluble amorphous pellicles of saccharine matter having glassy walls containing an extract of roasted coffee beans and a minor portion of milk solids.

8. As a new article of manufacture a powder composed of small, thin, amorphous readily soluble pellicles consisting of the desiccated and broken walls of bubbles of a perfect solution of saccharine matter and extract of roasted coffee beans having impalpable milk solids retained therein to the extent of less than thirty-five per cent by weight of the total solid materials.

9. As a new article of manufacture a powder composed of readily soluble amorphous pellicles of glucose and other saccharine matter containing an extract of roasted coffee beans and a minor portion of milk solids.

10. The process of forming a readily soluble powder of amorphous saccharine matter and soluble flavoring matter containing insoluble materials which comprises mixing with a perfect solution of the soluble materials an amount of finely divided insoluble material equalling about a third or less of the weight of the solid constituents of the soluble materials, evaporating the mixture and desiccating the solid residue at a low pressure and at a temperature which is below that of fusion of the saccharine matter and which will not produce any hurtful modification of the taste of the other material, until the same is transformed into a foamlike mass of bubbles, and then crushing the dry walls of such bubbles.

11. The process of forming a readily soluble powder containing all the components of the beverage known as sweetened coffee with milk which comprises mixing a given quantity of a perfect solution of saccharine matter and soluble extract of roasted coffee beans with a quantity of milk solids not greater than about one half or less of the combined weight of the solids of the coffee extract and saccharine matter used, evaporating the fluid portion of the mixture and desiccating the solid residue thereof at a low pressure and at a temperature below that which will fuse any of the materials or unfavorably modify the taste thereof, until such residue is transformed into a foamlike mass of small bubbles, and then crushing the dry walls of such bubbles.

12. The process of forming a readily soluble powder containing edible matter in solid solution therein which comprises mixing such matter with a perfect saccharine solution comprising glucose, evaporating out the fluids of the mixture and transforming the entire solid residue into a foamlike mass of small bubbles, desiccating said mass and reducing the dry walls of the bubbles to the form of small, thin, slightly curved pellicles.

13. The process of forming a readily soluble powder of saccharine matter containing insoluble materials, which comprises forming an emulsion of a perfect solution of the saccharine matter and the insoluble materials, evaporating the fluid portion of the mixture and desiccating the solid residue at a low pressure and at a temperature which is below that of fusion of the saccharine matter until the same is transformed into a foamlike mass of bubbles, and then crushing the dry walls of said bubbles.

14. The process of forming a powder which on the addition of water will form the beverage known as sweetened coffee with milk, which comprises forming a mixture of milk, a perfect solution of saccharine matter and a soluble extract of roasted coffee beans, evaporating the fluid portion of the mixture and desiccating the solid residue thereof at a low pressure and at a temperature below that which will fuse any of the materials or unfavorably modify the taste thereof, until such residue is transformed into a foamlike mass of small bubbles, and then crushing the dry walls of such bubbles.

GEORGE WASHINGTON.